United States Patent
Drewry et al.

(10) Patent No.: US 8,303,161 B2
(45) Date of Patent: *Nov. 6, 2012

(54) WATER SUPPLY THERMOCLINE DETECTION AND MIXING PROCESS

(76) Inventors: Kristinn G. Drewry, Bellevue, WA (US); Richard J. Koopmans, Bellevue, WA (US)

( * ) Notice: Subject to any disclaimer, the term of this patent is extended or adjusted under 35 U.S.C. 154(b) by 406 days.

This patent is subject to a terminal disclaimer.

(21) Appl. No.: 12/381,942

(22) Filed: Mar. 18, 2009

(65) Prior Publication Data

US 2009/0277846 A1 Nov. 12, 2009

Related U.S. Application Data

(60) Provisional application No. 61/127,376, filed on May 12, 2008.

(51) Int. Cl.
*B01F 3/04* (2006.01)
*B01F 13/02* (2006.01)

(52) U.S. Cl. ............ 366/106; 366/142; 366/151.1

(58) Field of Classification Search .......... 366/101, 366/103, 104, 105, 106, 107, 142, 143, 151.1; 210/85, 90, 149; 222/3, 195, 261; 261/96, 261/121.4; 137/3, 4, 5
See application file for complete search history.

(56) References Cited

U.S. PATENT DOCUMENTS

| | | | |
|---|---|---|---|
| 3,159,383 A * | 12/1964 | Van Munster | 366/107 |
| 3,671,018 A * | 6/1972 | McKibben et al. | 366/107 |
| 4,136,970 A * | 1/1979 | Cabrera et al. | 366/101 |
| 4,595,296 A | 6/1986 | Parks | |
| 5,298,164 A | 3/1994 | Hapach et al. | |
| 5,538,162 A * | 7/1996 | Reh et al. | 222/63 |
| 5,592,868 A * | 1/1997 | Asai et al. | 99/348 |
| 6,280,636 B1 | 8/2001 | Locklair | |
| 6,372,140 B2 | 4/2002 | Kelly | |
| 6,435,209 B1 | 8/2002 | Heil | |
| 6,629,773 B2 | 10/2003 | Parks | |
| 6,896,804 B2 | 5/2005 | Haerther et al. | |
| 7,005,068 B2 | 2/2006 | Hoffland | |
| 7,282,141 B2 | 10/2007 | Koopmans et al. | |
| 7,374,675 B2 | 5/2008 | Koopmans et al. | |
| 2002/0154567 A1* | 10/2002 | Husher | 366/132 |
| 2006/0070948 A1 | 4/2006 | Wickham | |
| 2006/0081534 A1 | 4/2006 | Dimitriou et al. | |
| 2006/0086662 A1 | 4/2006 | Ogden | |
| 2006/0096918 A1 | 5/2006 | Semmens | |
| 2006/0124543 A1 | 6/2006 | Pehrson et al. | |
| 2006/0254977 A1 | 11/2006 | Koopmans et al. | |
| 2008/0270162 A1* | 10/2008 | Machacek | 705/1 |
| 2009/0207689 A1* | 8/2009 | Artusi | 366/140 |
| 2009/0279380 A1 | 11/2009 | Koopmans et al. | |

FOREIGN PATENT DOCUMENTS

JP 07-203806 8/1995

* cited by examiner

*Primary Examiner* — Yogendra Gupta
*Assistant Examiner* — Emmanuel S Luk
(74) *Attorney, Agent, or Firm* — Anthony Claiborne

(57) ABSTRACT

A means for mixing drinking water stored in large storage tanks, preventing stratification of the water, detects incipient stratification of water along thermoclines, and, responsive to thermocline detection, generates large mixing bubbles toward the bottom of the tank, causing mixing of layers of water in the tank through turbulence created as the bubbles rise through the tank.

8 Claims, 6 Drawing Sheets

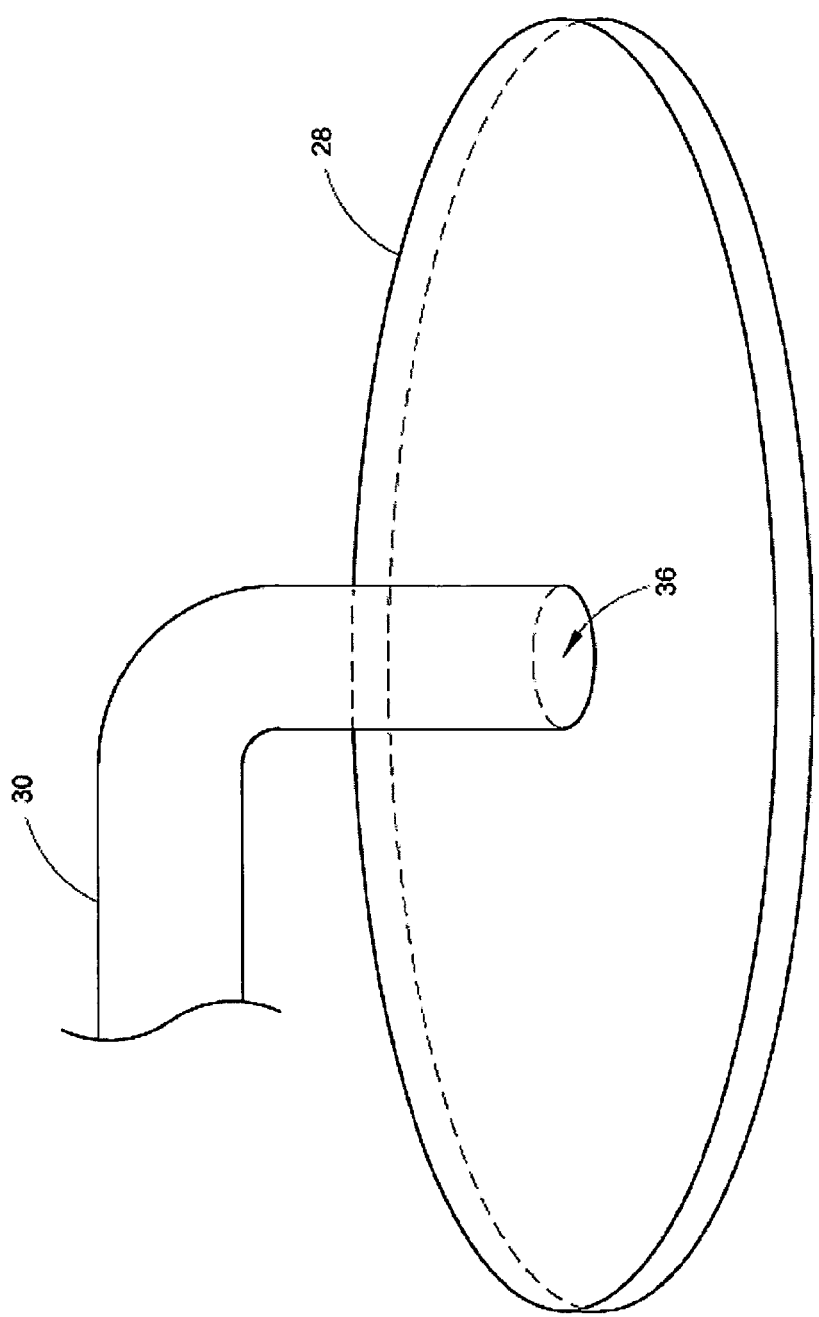

WATER SUPPLY THERMOCLINE DETECTION AND MIXING PROCESS

CROSS REFERENCE TO RELATED APPLICATION

This application claims priority from U.S. provisional application No. 61/127,376, filed May 12, 2008, entitled WATER SUPPLY MIXING PROCESS.

BACKGROUND OF THE INVENTION

1. Field of the Invention

This invention relates to methods for ensuring purity of potable water supplies. More specifically, this invention relates to methods for avoiding stagnation of such water supplies in storage tanks.

2. Description of the Related Art

Stagnant water is a leading cause of the deterioration of drinking water stored in water storage tanks. When a large capacity tank is underutilized, differential thermal conditions in the tank can cause the contents to stratify in thermoclines, where warmer layers of water meet cooler layers. As is well known in the art, the accumulation and growth of algae, protozoan pathogens such as cryptosporidium and other undesirable organisms is favored at such thermoclines.

If, as is often the case, a tank with stratified contents is both filled and emptied from a limited portion of the tank, water supplied by the tank will be from recently filled, fresher strata, while the remaining strata in the tank may age and harbor increasing microbial populations, becoming stagnant.

In many public water systems, water is disinfected before it enters the storage tank to ensure that potentially dangerous microbes are killed before the water enters the distribution system. Because residual disinfectant remains in the water after treatment, disinfectant agents such as chlorine, chloramines or chlorine dioxide provide further protection from microbial reproduction after water enters the distribution system. The efficacy of such residual disinfectants diminishes with time, however. When disinfected water is allowed to stratify in storage tanks, older layers of water may lose disinfectant protection altogether, leading to the possibility that such portions of the tank become stagnant despite disinfectant treatment of water prior to transport to the tank.

What is needed is a method of preventing or remediating stratification of water in storage tanks. As will be understood by those in the art, stratification can be obviated by sufficient vertical mixing of water in the tank.

A number of means for mixing liquids are available to de-stratify stored water. A mechanical mixer, comprised of a screw or blade that is turned by a motor, is commonly employed to mix various liquids. Mechanical mixers, however, are subject to a number of shortcomings for mixing drinking water in storage tanks.

Mixing the strata in a typical large water storage tank with a mechanical mixer requires a large amount of energy relative to the amount of water that is actually mixed. Further, agitation of the water in the tank by mechanical mixers can disturb sediment settled in the bottom of the tank, resulting in suspended sediment degrading the aesthetics of the water for drinking. Further still, mechanical mixers are often inefficient, mixing some but not all strata in a storage tank. In addition, acquisition costs can be high for a mechanical mixer having sufficient capacity to mix all the strata in a large storage tank. Yet further, costs are high to retrofit an existing water storage tank with a mechanical mixer, retrofitting further often entailing a need to drain the tank or otherwise temporarily remove the tank from the water distribution system. What is needed are more economical and efficient means of mixing water to eliminate stratification with minimal disturbance to sediment in the tank. What is needed further is such means that can be retrofitted to a water storage tank operation economically and without a need to take the water tank off-line.

Mixing water in the tank more than is needed for destratification is undesirable, not only because unnecessary mixing is uneconomical but also because mixing may disturb sediments in the tank, affecting the aesthetic quality of the drinking water. Accordingly, it is further desirable that the mixer that is used to obviate stratification be engaged only when needed, i.e. only when stratification is taking place. The present invention, therefore, provides a means for detecting thermocline formation and engaging the mixer when thermoclines are found.

BRIEF SUMMARY OF THE INVENTION

The present invention detects incipient stratification of water along thermoclines. When thermocline formation is indicated, the mixer generates large mixing bubbles below the thermocline, causing mixing of layers of water in the tank through turbulence created as the bubbles rise through the tank.

BRIEF DESCRIPTION OF THE DRAWINGS

The foregoing objects, as well as further objects, advantages, features and characteristics of the present invention, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 2a is a diagram of a bubble forming plate according to an embodiment of the present invention;

DETAILED DESCRIPTION OF THE INVENTION

Figure 1:
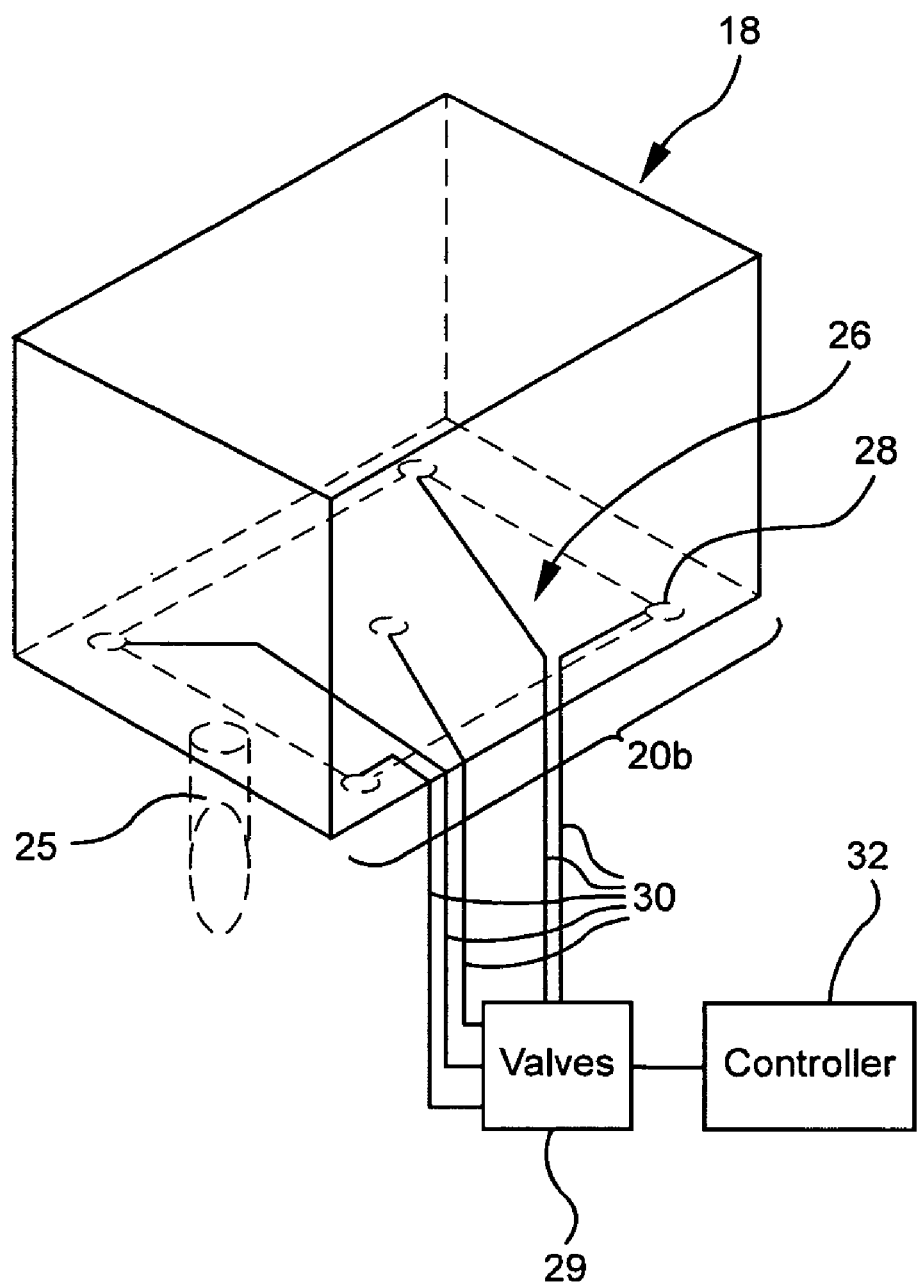
FIG. 1 is a diagram of an embodiment of the present invention in a rectangular storage tank.

FIG. 1 is a perspective view of a water storage tank 18 in which is installed a mixer according to an embodiment of the invention. The tank 18 is filled with drinking water from below by standpipe 25.

Located in tank 18, a mixer 26 injects a gas safe for drinking water, such as air, to generate large mixing bubbles. As further discussed in reference to FIG. 3 below, the mixing bubbles are large enough to move a substantial amount of water as they rise toward the water's surface. For effective and efficient mixing of drinking water, bubbles generated by the present invention should be large, from approximately one half meter to several meters in diameter. The mixing current, resulting from turbulence from displaced water as the large bubbles rise, mixes the water to obviate stratification.

The mixer 26 includes a forming plate 28 to form mixing bubbles from the injected gas, and a valve 29 to permit or prevent the gas from reaching the forming plate 28. The mixer 26 also includes a distribution line 30 to supply the forming plate 28 with the gas when the corresponding valve 29 is open, and a controller 32 to open and close the valve 29. For example, in one embodiment, the mixer 26 includes five forming plates 28, five valves 29, and five distribution lines 30, and the controller 32 includes a memory (not shown) and a processor (not shown) to allow a user to input data to control when and how long each valve.

Each forming plate 28, one embodiment of which is shown in FIG. 2a, includes an orifice 36. When the valve 29 is opened, air flows through the distribution line 30 toward the forming plate 28, and then exits the distribution line 30 through the orifice 36. The forming plate 28 prevents the air from rising toward the surface of the water until the valve 29 injects more air than the forming plate 28 can hold, at which time most of the air escapes from under the forming plate 28 and forms a large mixing bubble. The large mixing bubble then rises toward the surface of the water. When the valve 29 is closed, air does not flow through the orifice 36.

Figure 2B:
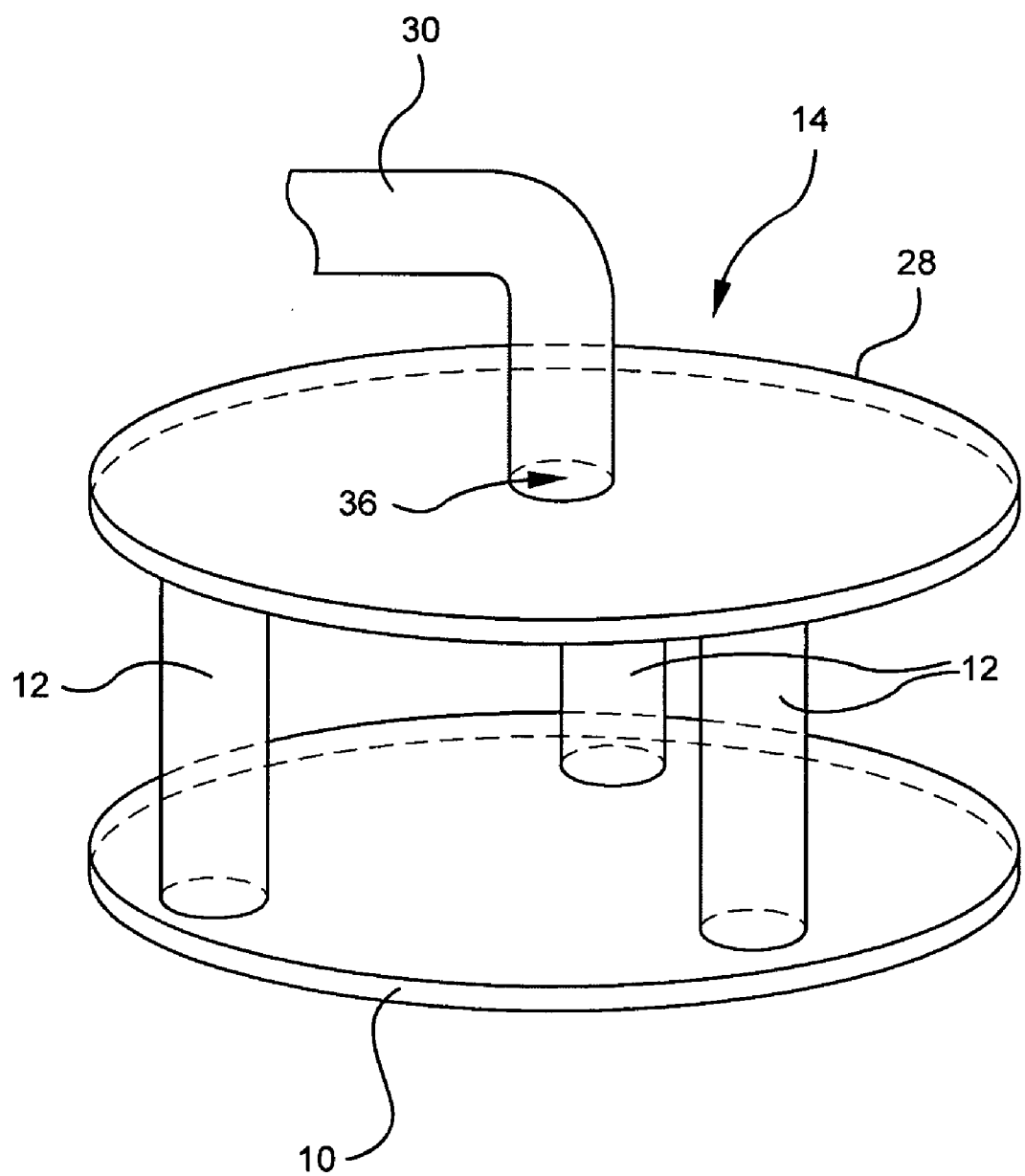
FIG. 2b is a diagram of an alternative embodiment of a bubble forming plate.

By outfitting with strong, permanent magnets, plates 28 may be installed in an active, filled water storage tank that is comprised of ferromagnetic or ceramic magnetic material. In such a case, distribution lines 30 are flexible and plates 28 are simply dropped into tank 18. Referring now to FIG. 2b, illustrated is plate assembly 14, comprising plate 28 operatively connected to flexible distribution line 30. Plate 28 is further attached to permanent flat magnet 10 via support legs 12, providing a space between plate 28 and magnet 10, thereby elevating forming plate 28 some distance above the bottom of tank 18 to allow for the formation of large mixing bubbles on the underside of plate 28. As will be appreciated by those of skill in the art, the required length of support legs 12 may be varied with considerable tolerance, from an inch or so to a dozen or more inches. In embodiments using magnets for this purpose, it is important that magnet 10 be sufficiently strong to retain plate assembly 14 on the bottom of tank 18 against the buoyancy of both distribution line 30 and plate assembly 14 when large bubbles are formed on the underside of plate 28.

Figure 3:
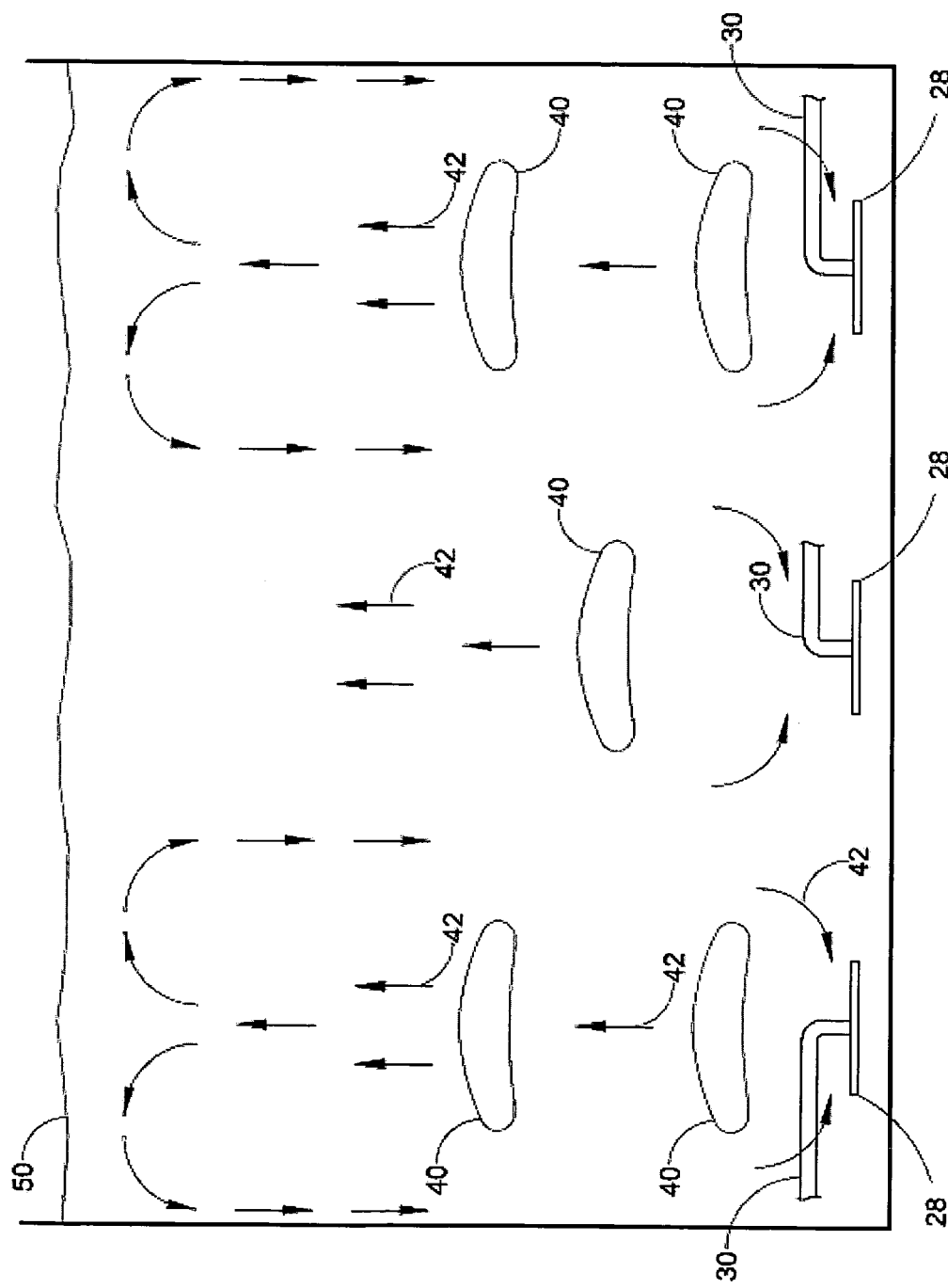
FIG. 3 is a diagram illustrating mixing of drinking water in a storage tank by turbulence caused by rising bubbles according to an embodiment of the invention such as illustrated in FIG. 1.

FIG. 3 illustrates the mixing caused by the large bubbles generated by a mixer such as that illustrated in FIG. 1. The mixing bubbles 40 generate the mixing currents indicated by the arrows 42 (28 arrows shown but only 5 labeled with the reference number 42 for clarity) that mix the water 50. The strength of the mixing currents 42 depends on the speed at which each mixing bubble 40 travels through the water and the size of each bubble 40.

The speed of the mixing bubble 40 depends on the density of the gas employed in the invention relative to the density of water 50, and the bubble's shape. The greater the difference between the densities of water 50 and the gas, the faster the mixing bubbles 40 rise through water 50. The more aerodynamic the shape of the bubble 40 becomes the faster the bubble 40 rises through water 50. For example, in one embodiment, the bubble 40 forms an oblate spheroid—a sphere whose dimension in the vertical direction is less than the dimension in the horizontal direction. In other embodiments, the bubble 40 forms a squished sphere having the trailing surface—the surface of the bubble 40 that is the rear of the bubble 40 relative to the direction in which bubble 40 moves—that is convex when viewed from the direction that the bubble 40 moves.

The size of the mixing bubble 40 depends on the flow rate of the gas into water 50. The flow rate depends on the size of the orifice 36 and the gas's injection pressure. As one increases the gas injection pressure, one increases the amount of gas injected into water 50 over a specific period of time that the valve 29 is open. And, as one increases the area of the orifice 36, one increases the amount of gas injected into water 50 over a specific period of time that the valve 29 is open. As one increases the diameter of the forming plate 28 one increases the amount of gas the forming plate 28 can hold before the gas escapes it. For example, in one embodiment the size of the bubble 40 is approximately 0.5 meters across its largest dimension. In other embodiments, the bubble 40 is approximately 3 meters or greater across in largest dimension.

Figure 4:
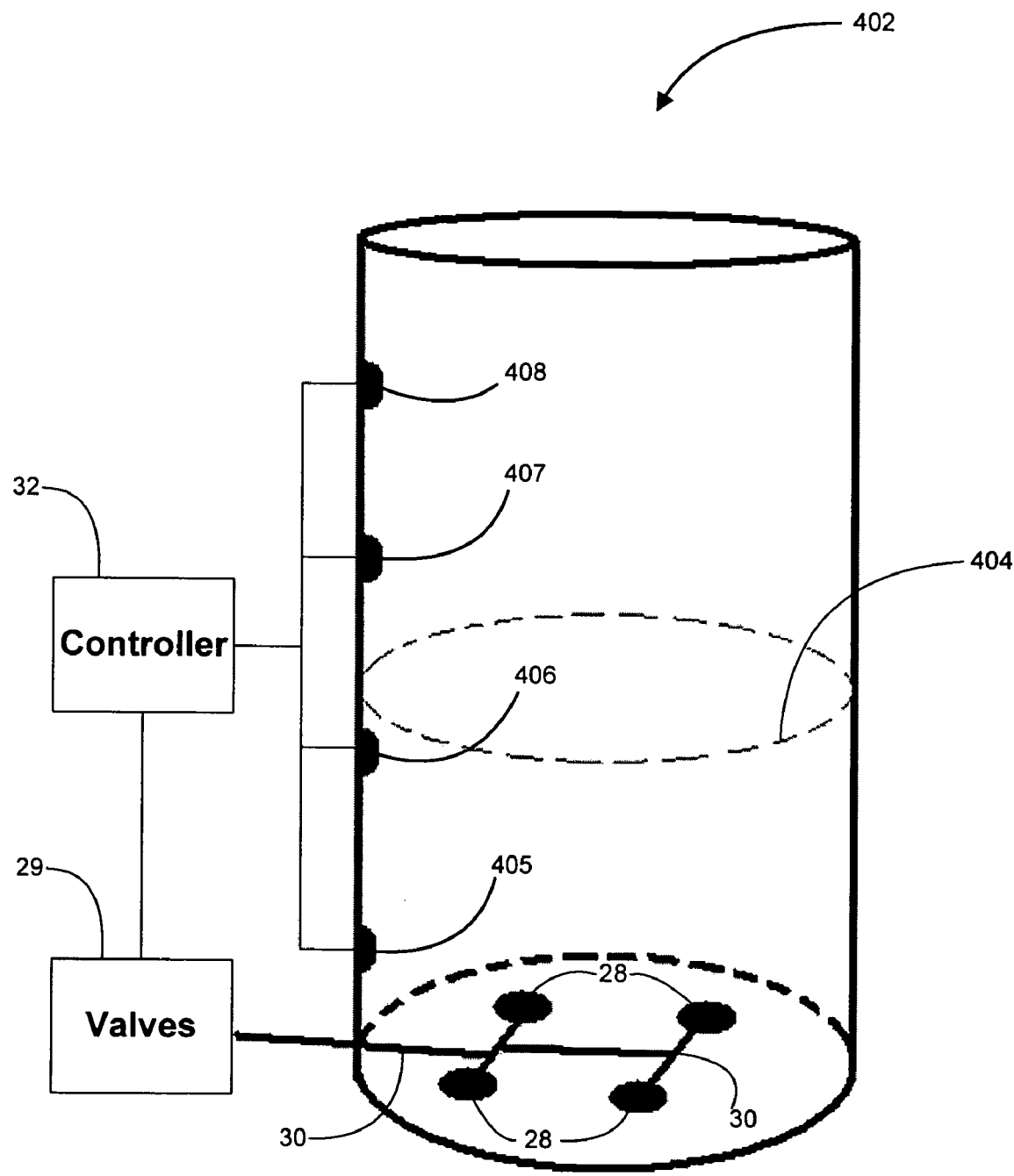
FIG. 4 is a diagram illustrating a thermocline detection arrangement according to an embodiment of the present invention.

FIG. 4 illustrates the thermocline detection aspect of this invention. Depicted is a cylindrical tank 402 in which a thermocline 404 has developed. Embodiments of the present invention detect the presence of thermocline 404 by comparing temperature readings from sensors 405 through 408. The presence of thermocline 404 is indicated by significant difference between temperature readings from sensors 407, 408 located above thermocline 404 and sensors 405, 406 located below thermocline 404. While the actual value of a temperature difference indicating a thermocline will vary with tank configuration, prevailing weather conditions, etc., a temperature difference of 4 to 10 degrees C. between different levels of water in the tank may indicate the presence of thermocline 404. Responsive to detecting such a temperature difference, controller 32 directs valves 29 to provide pressurized gas to supply line 30, providing gas to form bubbles under plates 28 as discussed above in reference to FIG. 1.

As will be appreciated by those of skill in the art, sensors 405-408 may be any form of electronic sensor, such as a thermistor, capable of measuring temperatures in the range of 0 to 100 degrees C. For tanks comprised of ferromagnetic material, sensors 405-408 may comprise a means of magnetic adhesion, for ease of installation. For tanks without substantial thermal insulation, temperature sensors 405-408 may adhere to the exterior of tank 402.

Alternatively, sensors 405-408 may detect a parameter other than temperature that indicates the formation of a thermocline and/or stagnation of water in portions of tank 402. Such parameters may include levels of free chlorine, oxygen, nitrates, biological oxygen demand, and other parameters known to those of skill in the art, whose differential values at different levels in the tank indicate that water stratification is taking place.

In the depicted embodiment, four sensors 405-408 are illustrated. As will be appreciated by those of skill in the art, the actual number and location of sensors required for accurate thermocline detection are determined by several factors, principal among which is the geometry of tank 402. Accurate thermocline detection may be obtained with sensors spaced farther apart vertically in tanks that are taller and narrower than in tanks that are shorter and wider. Spacing between sensors may vary from a meter or less to a dozen or more meters vertically.

The actual number of sensors employed may be as few as two or as many as ten or more. What is required is that a sufficient plurality of sensors be employed and placed so that there is a difference in parameter measurement between at least one of the sensors and the rest of the sensors to indicate that a thermocline is forming or has formed.

Figure 5:
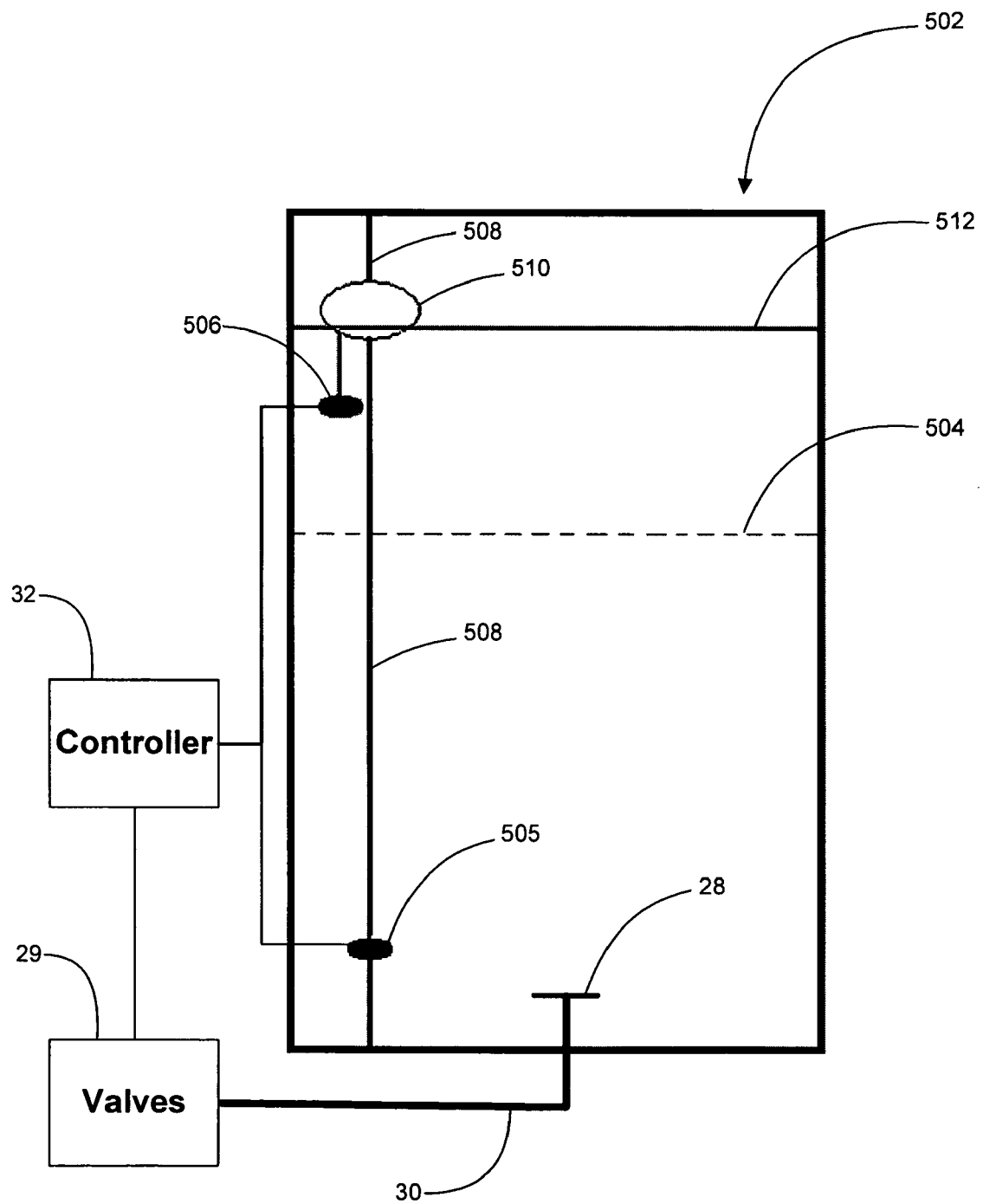
FIG. 5 is a diagram illustrating a thermocline detection arrangement according to an alternative embodiment of the present invention.

FIG. 5 depicts an alternative embodiment of the thermocline detection aspect of the present invention. Depicted is tank 502, in which cable 508 is affixed to run vertically from near the bottom of tank 502 to near the top of tank 502. In some embodiments, cable 508 may be affixed to the floor of tank 502 by means of a strong permanent magnet adhering to the floor of tank 502. Affixed on cable 508 approximately 18 inches from the floor of tank 502 is lower sensor 505. Floating on the surface 512 of water in tank 502 is float 510, fashioned and disposed to traverse up and down the length of cable 508 as water level 512 rises and falls in tank 502. Affixed to float 510, and depending about 12 inches below it, is upper sensor 506. In a manner similar to that described in relation to FIG. 4 above, sensors 505 and 506 provide temperature data to controller 32. When the difference between the temperature detected by sensor 505 and the temperature detected by sensor 506 exceeds a predetermined value, presence of a thermocline 504 is indicated, and, responsive to such indication, controller 32 directs valves 29 to open, providing gas through distribution line 30 to forming plate 28, thereby forming large bubbles which generate mixing currents, mixing the contents of tank 502 to break up thermocline 504.

Just as observed in relation to FIG. 4 above, sensors 505 and 506 may, in alternative embodiments, detect a parameter other than temperature that indicates the formation of a thermocline and/or stagnation of water in portions of tank 502. Such parameters may include levels of free chlorine, oxygen, nitrates, biological oxygen demand, and other parameters known to those of skill in the art, whose differential values at different levels in the tank indicate that water stratification is taking place.

Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above. While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention.

We claim:

1. A process for mixing a supply of water in a storage tank, comprising:
   determining whether water has stratified in the tank; and
      responsive to the determination that water has stratified in the tank,
   releasing a quantity of compressed gas to form at least one large mixing bubble to rise through the water in the tank, whereby the rising of the at least one large mixing bubble generates currents in the water to mix and destratify the water supply.

2. A process for mixing a supply of water according to claim 1, wherein the step of determining whether water has stratified is performed by measuring at least one parameter indicative of water stratification at different vertical levels in the tank.

3. A process for mixing a supply of water according to claim 2, wherein the at least one parameter indicative of water stratification is selected from the group consisting of temperature, oxygen concentration, chlorine concentration, nitrate concentration and biological oxygen demand.

4. A system to reduce stratification of a supply of water in a storage tank, the system comprising
   a means for determining whether the water supply should be mixed; and
   a means, responsive to the determination that the water supply should be mixed, for generating at least one large mixing bubble,
   whereby the rising of the at least one large mixing bubble generates currents in the water to mix the water supply and thereby destratify it.

5. A system to reduce stratification of a supply of water in a storage tank according to claim 4, wherein the means for determining whether the water supply should be mixed comprises a plurality of sensors located at different vertical levels in the tank, the sensors in communication with a controller, the sensors providing measurement information to the controller regarding at least one parameter indicative of water stratification, the controller determining that water stratification has occurred when the measurement of the at least one parameter from a first sensor at a lower vertical level in the tank differs by more than a pre-determined value from the measurement of the at least one parameter from a second sensor at a higher vertical level in the tank.

6. A system to reduce stratification of a supply of water in a storage tank according to claim 5, wherein the at least one parameter indicative of water stratification is selected from the group consisting of temperature, oxygen concentration, chlorine concentration, nitrate concentration and biological oxygen demand.

7. A system to reduce stratification of a supply of water in a storage tank according to claim 5, wherein the at least one large mixing bubble is generated at a vertical location in the tank below that of the second sensor.

8. A system to reduce stratification of a supply of water in a storage tank according to claim 5, wherein the first sensor is affixed at a specified height above the floor of the tank, and the second sensor is suspended from a float to depend at a specified depth below the surface of the water in the tank.

* * * * *